(12) United States Patent
Takeshita et al.

(10) Patent No.: US 12,354,811 B2
(45) Date of Patent: Jul. 8, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Masatoshi Takeshita, Osaka (JP); Hiromi Ozawa, Osaka (JP); Yihan Zhang, Osaka (JP); Hitoshi Fukui, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 193 days.

(21) Appl. No.: 18/004,612

(22) PCT Filed: Jul. 15, 2021

(86) PCT No.: PCT/JP2021/026539
§ 371 (c)(1),
(2) Date: Jan. 6, 2023

(87) PCT Pub. No.: WO2022/024771
PCT Pub. Date: Feb. 3, 2022

(65) Prior Publication Data
US 2023/0245836 A1    Aug. 3, 2023

(30) Foreign Application Priority Data
Jul. 31, 2020    (JP) ................. 2020-130168

(51) Int. Cl.
*H01G 9/025*    (2006.01)
*H01G 9/15*    (2006.01)

(52) U.S. Cl.
CPC ............... *H01G 9/025* (2013.01); *H01G 9/15* (2013.01)

(58) Field of Classification Search
None
See application file for complete search history.

(56) References Cited

U.S. PATENT DOCUMENTS

2007/0201188 A1* 8/2007 Nishimura ............. H01G 9/042
361/524
2013/0059064 A1    3/2013 Majima et al.
(Continued)

FOREIGN PATENT DOCUMENTS

CN        103578773        2/2014
JP        2006278794 A * 10/2006 ............... C08K 5/34
(Continued)

OTHER PUBLICATIONS

International Search Report of PCT application No. PCT/JP2021/026539 dated Oct. 19, 2021.

*Primary Examiner* — Eric W Thomas
(74) *Attorney, Agent, or Firm* — Rimon P.C.

(57) ABSTRACT

A solid electrolytic capacitor element includes an anode body, a dielectric layer disposed on a surface of the anode body, and a cathode part covering at least a part of the dielectric layer are provided. The cathode part includes a solid electrolyte layer covering the at least the part of the dielectric layer. The solid electrolyte layer contains a first polymer and a second polymer component. The first polymer component includes a monomer unit corresponding to a thiophene compound. The second polymer component includes a polymer anion. A Raman spectrum of a surface layer in the solid electrolyte layer has a peak characteristic for the first polymer component.

8 Claims, 3 Drawing Sheets

(56) References Cited

U.S. PATENT DOCUMENTS

| | | |
|---|---|---|
| 2013/0242465 A1 | 9/2013 | Weaver et al. |
| 2015/0187504 A1 | 7/2015 | Takatani et al. |
| 2015/0255222 A1 | 9/2015 | Machida et al. |

FOREIGN PATENT DOCUMENTS

| | | |
|---|---|---|
| JP | 2007-299856 A | 11/2007 |
| JP | 2013-058807 | 3/2013 |
| JP | 2016-171111 | 9/2016 |
| JP | 2018-117123 | 7/2018 |
| WO | 2014/038440 | 3/2014 |
| WO | 2014/155422 | 10/2014 |

\* cited by examiner

SOLID ELECTROLYTIC CAPACITOR ELEMENT AND SOLID ELECTROLYTIC CAPACITOR

TECHNICAL FIELD

The present disclosure relates to a solid electrolytic capacitor element and a solid electrolytic capacitor.

BACKGROUND

A solid electrolytic capacitor includes a solid electrolytic capacitor element, a resin exterior body or case that seals the solid electrolytic capacitor element, and an external electrode electrically connected to the solid electrolytic capacitor element. The solid electrolytic capacitor element includes an anode body, a dielectric layer disposed on a surface of the anode body, and a cathode part that covers at least a part of the dielectric layer. The cathode part includes a solid electrolyte layer containing a conductive polymer and a dopant covering at least a part of the dielectric layer.

From the viewpoint of easily forming the solid electrolyte layer, a method using a liquid dispersion containing a conductive polymer component is frequently used for forming the solid electrolyte layer (for example, Unexamined Japanese Publication No. 2013-58807 and International Publication WO2014/155422).

SUMMARY

A solid electrolytic capacitor element according to one aspect of the present disclosure includes: an anode body; a dielectric layer disposed on a surface of the anode body; and a cathode part covering at least a part of the dielectric layer. The cathode part includes a solid electrolyte layer covering the at least the part of the dielectric layer. The solid electrolyte layer contains a first polymer component including a monomer unit corresponding to a thiophene compound and a second polymer component including a polymer anion. A Raman spectrum of a surface layer in the solid electrolyte layer has a peak characteristic for the first polymer component.

A solid electrolytic capacitor according to another aspect of the present disclosure includes the solid electrolytic capacitor elements described above.

According to the present disclosure, an initial increase in equivalent series resistance (ESR) of a solid electrolytic capacitor can be suppressed to a low level.

DESCRIPTION OF EMBODIMENT

Figure 1:
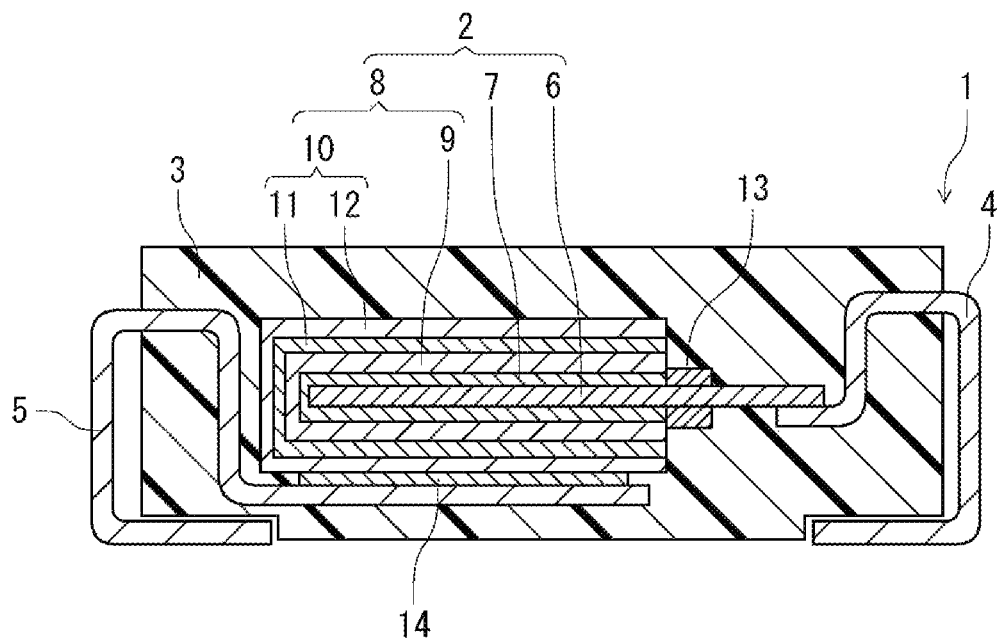
FIG. 1 is a schematic sectional view illustrating a solid electrolytic capacitor according to one exemplary embodiment of the present disclosure.

Prior to the description of exemplary embodiments, a problem in the prior art will be briefly described below.

Since a method of forming a solid electrolyte layer using a dispersion is simple, it has become the mainstream of methods of forming a solid electrolyte layer in recent years. On the other hand, in the solid electrolytic capacitor element, a porous part is formed in at least a surface layer of the anode body. The dielectric layer is formed along inner wall surfaces of pores and cavities (It may be referred to as a pit.) on a surface of the anode body, which include including the inner wall surfaces of the pores in the porous part. Thus, fine irregularities are formed on a surface of the dielectric layer according to a shape of the surface of the anode body. The dispersion contains a conductive polymer component having a relatively high molecular weight (such as a conjugated polymer such as a polythiophene-based polymer and a dopant). Hence, when the dispersion is used, it is difficult to highly fill fine recesses on the surface of the dielectric layer with the conductive polymer component. When the fine recesses of the dielectric layer cannot be highly filled with the conductive polymer component, the conductivity of the solid electrolyte layer is lowered. Furthermore, since an orientation of the conjugated polymer is also random in the dispersion, it is difficult to improve the orientation of the conjugated polymer in the solid electrolyte layer to be formed. This also tends to decrease the conductivity of the solid electrolyte layer. A decrease in conductivity of the solid electrolyte layer leads to a decrease in performance of the solid electrolytic capacitor, such as an increase in ESR, a decrease in electrostatic capacity, or an increase in tan δ of the solid electrolytic capacitor.

From the viewpoint of easily securing high stability and high heat resistance, it is preferable to use a polymer anion as the dopant. The polymer anion has high affinity for the conjugated polymer and easily secures high conductivity of the solid electrolyte layer. The polymer anion is usually added to the dispersion and used for forming the solid electrolyte layer. However, it has been found that when a dispersion containing a polymer anion is used, the polymer anion segregates on the surface of the solid electrolyte layer and the vicinity thereof in the solid electrolyte layer to be formed. Since the polymer anion itself is insulating, when the polymer anion segregates, the resistance of the solid electrolyte layer increases. Usually, a cathode lead-out layer is formed on the surface of the solid electrolyte layer so as to cover the surface. However, the presence of segregated polymer anions in the surface layer declines physical and electrical bonding property between the solid electrolyte layer and the cathode lead-out layer. As a result, contact resistance between the solid electrolyte layer and the cathode lead-out layer increases, and initial ESR increases, leading to deterioration of initial capacitor performance.

Furthermore, as a technique prior to the dispersion, there is also a method of forming a solid electrolyte layer using in-situ polymerization such as chemical polymerization. In the in-situ polymerization, the recesses of the dielectric layer can be highly filled with the conductive polymer component. However, in the in-situ polymerization, it is difficult to control the polymerization reaction, and a thickness of the solid electrolyte layer to be formed largely varies. Thus, it is difficult to ensure high conductivity of the solid electrolyte layer. Moreover, in the in-situ polymerization, it is difficult to control the polymerization reaction, and thus the types of raw material monomers and dopants of the conjugated polymer that can be used are limited. Actually, in the in-situ polymerization, a pyrrole compound is employed, and only a low molecular weight dopant is used as a dopant.

After a first solid electrolyte layer is formed on the surface of the dielectric layer by chemical polymerization, an outer second solid electrolyte layer may be formed using the dispersion. However, in the outer second solid electrolyte layer formed using the dispersion, the polymer anion segregates on the surface layer, and the orientation of the conjugated polymer is low, so that the conductivity is low. Furthermore, in the inner first solid electrolyte layer, the types of the raw material monomer and the dopant are limited.

In the solid electrolytic capacitor, when air intrudes into the solid electrolytic capacitor, the conjugated polymer is oxidized and deteriorated by the action of moisture or oxygen contained in the air, or the dopant contained in the solid electrolyte layer is dedoped by decomposition or the like, so that the solid electrolyte layer is deteriorated, and the conductivity of the solid electrolyte layer may be lowered. For example, when the solid electrolyte layer is formed using the dispersion, as described above, the segregation of the polymer anion weakens the physical joint between the solid electrolyte layer and the cathode lead-out layer, so that air more easily intrudes. Furthermore, when the dispersion is used, it is difficult to highly fill fine recesses on the surface of the dielectric layer with the conductive polymer component, so that air flow paths are easily formed in the recesses. Thus, the solid electrolyte layer is easily deteriorated. A solid electrolytic capacitor may be used in a high-temperature environment depending on use applications. Furthermore, the solid electrolytic capacitor is generally joined using solder to a substrate through a reflow step that is exposed to a high temperature. When the solid electrolytic capacitor is exposed to a high temperature or used for a long period of time, the deterioration of the solid electrolyte layer as described above becomes more remarkable, and the decrease in conductivity becomes remarkable, so that the decrease in capacitor performance tends to become apparent. For example, when a low-molecular dopant is used as in chemical polymerization, dedoping is likely to occur due to low stability of the dopant. Hence, when the solid electrolytic capacitor is exposed to a high temperature or used for a long period of time, an increase in ESR becomes remarkable.

In view of the above problems, in a solid electrolytic capacitor element and a solid electrolytic capacitor according to one aspect of the present disclosure, a solid electrolyte layer contains a first polymer component including a monomer unit corresponding to a thiophene compound and a second polymer component including a polymer anion. In a Raman spectrum of the surface layer in the solid electrolyte layer, a peak characteristic for the first polymer component is observed. In the solid electrolytic capacitor element, segregation of polymer anions in the solid electrolyte layer is suppressed, and the polymer anions are more uniformly dispersed in the solid electrolyte layer. Such a solid electrolyte layer can be formed by electrolytic polymerization of a precursor of the first polymer component in the presence of the second polymer component.

In the solid electrolytic capacitor element of the present disclosure, the first polymer component and the polymer anion can be dispersed in the solid electrolyte layer with high dispersibility. This not only increases electron conductivity of the conductive polymer component but also suppresses an increase in resistance of the solid electrolyte layer due to segregation of polymer anions. Furthermore, the fine recesses on the surface of the dielectric layer can be highly filled with the conductive polymer component, and the orientation of the conjugated polymer in the solid electrolyte layer is also high. Hence, an increase in resistance of the entire solid electrolyte layer is suppressed, and high conductivity of the solid electrolyte layer can be secured. Furthermore, the segregation of the polymer anion is suppressed, so that physical and electrical bonding property between the solid electrolyte layer and the cathode lead-out layer can be enhanced. Thus, the initial ESR of the solid electrolytic capacitor can be suppressed low. Furthermore, initial high electrostatic capacity can be secured, initial tan δ can be suppressed low, and initial excellent capacitor performance can be secured.

Furthermore, in the solid electrolytic capacitor element and the solid electrolytic capacitor of the present disclosure, a rigid solid electrolyte layer having excellent film quality due to high orientation of the conjugated polymer is formed although the solid electrolyte layer contains a polymer anion. Thus, even when the solid electrolytic capacitor is exposed to a high temperature or used for a long period of time, the occurrence of cracks in the solid electrolyte layer can be suppressed. In addition to suppressing the occurrence of cracks, the recesses on the surface of the dielectric layer are highly filled with the conductive polymer component, and adhesion between the solid electrolyte layer and the cathode lead-out layer is high. Hence, even when the solid electrolytic capacitor is exposed to a high temperature or used for a long period of time, ingress of air into the solid electrolyte layer is reduced. Furthermore, since the polymer anion has high stability and heat resistance, dedoping is also reduced. As a result, even when the solid electrolytic capacitor is exposed to a high temperature or used for a long period of time, deterioration of the solid electrolyte layer is suppressed, and deterioration of capacitor performance such as an increase in ESR can be suppressed. Thus, a solid electrolytic capacitor element and a solid electrolytic capacitor excellent in stability (including thermal stability) can be obtained. As the stability is enhanced, the reliability of the solid electrolytic capacitor element and the solid electrolytic capacitor can be enhanced.

In the solid electrolytic capacitor element and the solid electrolytic capacitor of the present disclosure, the recesses on the surface of the dielectric layer can be highly filled with the conductive polymer component, but variation in the thickness of the solid electrolyte layer can be reduced. As a result, high conductivity of the solid electrolyte layer can be secured, occurrence of short circuit or increase in leakage current can be suppressed, and stable capacitor performance can be secured.

Note that, when the polymer anion is segregated in the solid electrolyte layer, a spectrum waveform of the first polymer component cannot be observed due to a fluorescence reaction of the segregated polymer anion even if the Raman spectrum is measured for the surface layer of the solid electrolyte layer. Hence, in the Raman spectrum of the surface layer of the solid electrolyte layer formed using the dispersion, a peak characteristic for the first polymer component cannot be observed.

In the present specification, the Raman spectrum at the surface layer of the solid electrolyte layer is measured under the following conditions for the surface layer of the solid electrolyte layer. The surface layer of the solid electrolyte layer refers to a part from the surface of the solid electrolyte layer to a depth of 100 nm.

Raman spectrometer: RamanFORCE PAV manufactured by NanoPhoton Corporation
  Irradiation laser light wavelength: 532 nm
  Laser power density: 870 W/cm$^2$
  Diffraction grating: 300/cm
  Exposure time: 10 s Measurement wavenumber range: $0\ cm^{-1}$ or more and $4700\ cm^{-1}$ or less Temperature: 25° C.

For the measurement of the Raman spectrum, a sample collected by the following procedure can be used. First, the solid electrolytic capacitor is embedded in a curable resin to cure the curable resin. The cured product is subjected to polishing treatment or cross section polisher processing to expose a cross section (for example, a cross section G to be described later) parallel to a thickness direction of the solid electrolyte layer. In this way, a sample for measurement (sample A) is obtained. A Raman spectrum may be measured for the surface layer of the exposed cross section of the solid electrolyte layer of sample A.

Hereinafter, the solid electrolytic capacitor and the solid electrolytic capacitor element (hereinafter, may be simply referred to as a capacitor element) of the present disclosure will be described more specifically with reference to the drawings as necessary.

[Solid Electrolytic Capacitor]

The solid electrolytic capacitor includes one or more capacitor elements. At least one of the capacitor elements included in the solid electrolytic capacitor may include the solid electrolyte layer containing a first polymer component and a second polymer component. And in the Raman spectrum of a surface layer in the solid electrolyte layer, a peak characteristic for the first polymer component is observed. It is preferable that 50% or more (more preferably 75% or more) of the number of the capacitor elements included in the solid electrolytic capacitor include the solid electrolyte layer as described above, and it is more preferable that all the capacitor elements include the solid electrolyte layer as described above.

(Capacitor Element)

(Anode Body)

The anode body may include a valve metal, an alloy containing the valve metal, a compound containing the valve metal, or the like. These materials can be used singly or in combination of two or more kinds thereof. As the valve metal, for example, aluminum, tantalum, niobium, and titanium are preferably used. The anode body having a porous surface is obtained by, for example, roughening a surface of a base material (sheet-like (for example, a foil shape or a plate shape) substrate, etc.) containing the valve metal by etching or the like. The roughening can be performed by, for example, an etching treatment or the like. Furthermore, the anode body may be a molded body of particles that contain the valve metal or a sintered body of the molded body. Note that each of the molded body and the sintered body has a porous structure. Each of the molded body and the sintered body may have a sheet shape, a rectangular parallelepiped, a cube, or a shape similar thereto.

The anode body usually includes an anode lead-out part including a first end part of the anode body and a cathode formation part including a second end part of the anode body. The cathode part is usually formed on the cathode formation part of the anode body with a dielectric layer interposed between the cathode part and the cathode formation part. An anode terminal is connected to the anode lead-out part.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. The dielectric layer may be formed so as to cover at least a part of the anode body. Usually, the dielectric layer is formed on the surface of the anode body. Since the dielectric layer is formed on the porous surface of the anode body, the surface of the dielectric layer has a fine uneven shape as described above.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer may be used as long as the dielectric layer functions as a dielectric material.

(Cathode Part)

The cathode part includes a solid electrolyte layer covering at least a part of the dielectric layer. Furthermore, the cathode part may further include a cathode lead-out layer covering at least a part of the solid electrolyte layer. Usually, the cathode part is formed on at least a part of the surface of the anode body with the dielectric layer interposed between the cathode part and the cathode formation part. Hereinafter, the solid electrolyte layer and the cathode lead-out layer will be described.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode part in the solid electrolytic capacitor.

The solid electrolyte layer includes a first polymer component including a monomer unit corresponding to a thiophene compound and a second polymer component including a polymer anion. Hereinafter, the monomer unit corresponding to the thiophene compound may be referred to as a first monomer unit. The first polymer component is a π-conjugated polymer, and as the second polymer component acts as a dopant, it functions as a conductive polymer.

(First Polymer Component)

Examples of the thiophene compound corresponding to the first monomer unit include a compound having a thiophene ring and capable of forming a repeat structure of the first monomer unit. The thiophene compound can be linked at the 2-position and 5-position of the thiophene ring to form the repeat structure of the first monomer unit, which can form a polymer with a π electron cloud spread throughout the molecule. The thiophene compound also includes those having a substituent. The substituent may be, for example, at least one of the 3-position and 4-position of the thiophene ring. The substituent at the 3-position and the substituent at the 4-position may be linked to form a ring fused to a thiophene ring. Examples of the thiophene compound include thiophene which may have a substituent at least one of the 3- and 4-positions and an alkylene dioxythiophene compound ($C_{2-4}$ alkylenedioxythiophene compounds such as ethylenedioxythiophene compounds, and the like). The alkylene dioxythiophene compound also includes those having a substituent in a part of an alkylene group. The substituent of the thiophene compound is preferably an alkyl group ($C_{1-4}$ alkyl groups such as methyl group and ethyl group, and the like), an alkoxy group ($C_{1-4}$ alkoxy groups such as methoxy group and ethoxy group, and the like), a hydroxy group, a hydroxyalkyl group (such as a hydroxy $C_{1-4}$ alkyl group such as a hydroxymethyl group), or the like, but is not limited thereto. When the thiophene compound has two or more substituents, the substituents may be the same or different.

In particular, use of the first polymer component containing at least a first monomer unit corresponding to a 3,4-ethylenedioxythiophene compound is preferable because high heat resistance is easily obtained and higher conductivity of the solid electrolyte layer is easily secured.

In general, a thiophene compound needs a higher potential for polymerization than a pyrrole compound and thus is less likely to be polymerized. When at least a thiophene compound in which an electron donating group such as an alkylene dioxythiophene or an alkoxy group is substituted with a thiophene ring is used, the potential for polymerization is lowered, and thus the polymerization reaction of the thiophene compound can be rapidly advanced even in the presence of a polymer anion. Hence, even though the polymer anion is used, the conductive polymer component containing the first polymer component and the second polymer component including the polymer anion can be highly filled in the fine recesses on the surface of the dielectric layer in a state where the polymer components are more uniformly dispersed.

The first polymer component may include one kind of first monomer unit or two or more kinds of first monomer units. Furthermore, the solid electrolyte layer may contain one kind or two or more kinds of the first polymer component.

The first polymer component may include a second monomer unit other than the first monomer unit as necessary. From the viewpoint of easily securing higher electrostatic capacity, a molar ratio of the first monomer unit in the first polymer component is preferably 90 mol % or more. The molar ratio of the first monomer unit in the first polymer component is 100 mol % or less. The first polymer component may be composed of only the repeat structure of the first monomer unit.

The weight-average molecular weight (Mw) of the first polymer component is not particularly limited, but is, for example, in a range from 1,000 to 1 million, inclusive.
(Second Polymer Component)

Examples of the polymer anion included in the second polymer component include polymers having a plurality of anionic groups. Examples of such a polymer include a polymer including a monomer unit having an anionic group.

Examples of the anionic group include a sulfonic acid group and a carboxy group. In the solid electrolyte layer, the anionic group may be contained in a free form, an anion form, or a salt form, or may be contained in a form bonded or interacting with the first polymer component. In the present specification, all of these forms may be simply referred to as an "anionic group", a "sulfonic acid group", or a "carboxy group".

The second polymer component may include one polymer anion or two or more polymer anions. Note that the second polymer component includes only a polymer anion.

Examples of the polymer anion having a carboxy group include, but are not limited to, a copolymer using at least one of polyacrylic acid, polymethacrylic acid, acrylic acid, and methacrylic acid.

From the viewpoint of ensuring higher conductivity of the solid electrolyte layer and easily suppressing dedoping from the solid electrolyte layer, the second polymer component preferably includes a polymer anion having at least a sulfonate group.

Examples of the polymer anion having a sulfonic acid group include those containing a monomer unit $M_1$ corresponding to an organic sulfonic acid compound. The organic sulfonic acid compound may be any of aliphatic, alicyclic, aromatic, and heterocyclic. The polymer anion may be a homopolymer containing only the monomer unit $M_1$, or may be a copolymer containing the monomer unit $M_1$ and other monomer units.

Specific examples of the polymer anion having a sulfonic acid group include, but are not limited to, polyvinylsulfonic acid, polystyrenesulfonic acid, polyallylsulfonic acid, polyacrylsulfonic acid, polymethacrylsulfonic acid, poly (2-acrylamide-2-methylpropanesulfonic acid), polyisoprenesulfonic acid, polyestersulfonic acid, and phenolsulfonic acid novolac resin.

In particular, when the polymer anion has an aromatic ring, high heat resistance is obtained, so that dedoping is suppressed even when the solid electrolytic capacitor is exposed to a high temperature, and high conductivity of the solid electrolyte layer can be maintained. However, when the polymer anion is aggregated, strong fluorescence is easily emitted. Thus, when the polymer anion segregates on the surface layer of the solid electrolyte layer, peaks of the first polymer component and the second polymer component cannot be observed in the Raman spectrum on the surface layer of the solid electrolyte layer. In the capacitor element of the present disclosure, even when a polymer anion having an aromatic ring is used, segregation of the polymer anion in the surface layer of the solid electrolyte layer is suppressed, and a more uniform dispersion state of each of the first polymer component and the second polymer component in the solid electrolyte layer can be secured. Such an excellent dispersion state can be confirmed by a Raman spectrum.

Examples of the polymer anion having an aromatic ring include a polymer anion having an aromatic ring among polymer anions containing a monomer unit $M_1$ corresponding to an organic sulfonic acid compound. As such a polymer anion, one containing at least a monomer unit (it may be referred to as monomer unit $M_2$.) corresponding to an aromatic sulfonic acid compound as the monomer unit $M_1$ is preferable. Examples of such a polymer anion include, but are not limited to, polystyrene sulfonic acid (including a copolymer and a substituent having a substituent), aromatic polyestersulfonic acid, and a phenol sulfonic acid novolac resin among the above-mentioned polymer anions.

The weight-average molecular weight (Mw) of the polymer anion is, for example, 300 or more, preferably 500 or more, and more preferably 1000 or more. When a dispersion containing a polymer anion having a large Mw is used, segregation of the polymer anion tends to be remarkable in the surface layer of the solid electrolyte layer. In the present disclosure, even when the Mw of the polymer anion is relatively large (for example, 500 or more or 1000 or more), the first polymer component and the second polymer component can be more uniformly dispersed in the solid electrolyte layer. Thus, an increase in ESR can be further reduced, and other capacitor performance can be improved. The Mw of the polymer anion is, for example, 250,000 or less, preferably 200,000 or less, and may be 160,000 or less. When the Mw is in such a range, the polymerization of the raw material monomer of the first polymer component easily proceeds smoothly, and the dispersibility of the first polymer component and the second polymer component in the solid electrolyte layer can be further enhanced. These lower and upper limit values can be arbitrarily combined.

The weight-average molecular weight (Mw) of the polymer anion is a value in terms of polystyrene measured by gel permeation chromatography (GPC). Note that usually, GPC is measured using a polystyrene gel column, and water and methanol (volume ratio 8:2) that form a mobile phase.

The Mw of the polymer anion can be determined for a sample collected from the solid electrolytic capacitor element. More specifically, the GPC measurement can be performed using a sample collected by the following procedure. First, a cured product obtained in the same procedure as in the case of the sample for measurement of Raman spectrum measurement is subjected to polishing treatment or cross section polisher processing to expose the solid electrolyte layer. The solid electrolyte layer is scraped, and a polymer anion is extracted with hot water in a range from 80° C. to 100° C., inclusive. A sample (sample B) for measurement is obtained by concentrating the extract.

A content ratio of the second polymer component contained in the solid electrolyte layer may be, for example, in a range from 10 parts by mass to 1000 parts by mass, inclusive, or in a range from 50 parts by mass to 200 parts by mass, inclusive, with respect to 100 parts by mass of the first polymer component.

(Raman Spectrum)

In the capacitor element and the solid electrolytic capacitor of the present disclosure, segregation of polymer anions in the surface layer of the solid electrolyte layer is suppressed.

Hence, when the Raman spectrum of the surface layer of the solid electrolyte layer is measured, a peak characteristic for the first polymer component is observed without being inhibited by the fluorescence emission of the segregated polymer anion. This indicates that the first polymer component and the second polymer component are dispersed in the solid electrolyte with high dispersibility.

When the polymer anion segregates, the waveform of the Raman spectrum of the first polymer component cannot be confirmed due to fluorescence emission. Thus, the wave number of the peak is not particularly limited as long as the peak characteristic for the first polymer component is a peak derived from the first polymer component in the Raman spectrum. In the Raman spectrum of the first polymer component, the highest peak is usually observed in a wave number range from 1200 $cm^{-1}$ to 1600 $cm^{-1}$, inclusive (preferably less than 1550 $cm^{-1}$). Hence, the peak characteristic for the first polymer component preferably includes a peak (this peak may be referred to as a first peak) observed in such a wavenumber range. The wavenumber range in which the first peak is observed may be in a range from 1300 $cm^{-1}$ to 1600 $cm^{-1}$, inclusive (preferably less than 1550 $cm^{-1}$), or in a range from 1300 $cm^{-1}$ to 1500 $cm^{-1}$, inclusive.

In the Raman spectrum of the first polymer component, a peak (this peak may be referred to as a second peak) may also be observed in a wavenumber range from 2750 $cm^{-1}$ to 3000 $cm^{-1}$, inclusive. A peak height of the second peak is smaller than that of the first peak, but is not inhibited by the fluorescence emission of the segregated polymer anion. Thus, the second peak can be clearly observed. In this meaning, it can be said that the second peak is also one of peaks characteristic for the first polymer component. The wave number range in which the second peak is observed may be in a range from 2800 $cm^{-1}$ to 3000 $cm^{-1}$, inclusive, or in a range from 2800 $cm^{-1}$ to 2900 $cm^{-1}$, inclusive.

For example, when poly (3,4-ethylenedioxythiophene) (PEDOT) is used as the first polymer component, the first peak is observed in a range from 1350 $cm^{-1}$ to 1500 $cm^{-1}$, inclusive, and the second peak is observed in a range from 2800 $cm^{-1}$ to 2900 $cm^{-1}$, inclusive.

In the Raman spectrum of the surface layer of the solid electrolyte layer, a peak characteristic for the polymer anion can also be observed. For example, when the solid electrolyte layer contains a polymer anion including the monomer unit $M_2$ corresponding to the aromatic sulfonic acid compound, a peak (This peak may be referred to as a third peak.) based on the polymer anion can be observed in a range from 800 $cm^{-1}$ to 1050 $cm^{-1}$, inclusive, in the Raman spectrum.

A ratio ($=I_{p1}/I_{p3}$) of intensity $I_{p1}$ of the first peak to intensity $I_{p3}$ of the third peak may be, for example, 2 or more, 3 or more, 4 or more, 5 or more, or 6 or more. When the $I_{p1}/I_{p3}$ ratio is in such a range, the first polymer component and the second polymer component are more uniformly dispersed in the solid electrolyte, and higher conductivity can be secured. An upper limit of the $I_{p1}/I_{p3}$ ratio is not particularly limited, but is, for example, 50 or less.

When the solid electrolyte layer contains a polymer anion including the monomer unit $M_2$ corresponding to the aromatic sulfonic acid compound, in the Raman spectrum of the solid electrolyte layer, peaks (the peaks may be referred to as a fourth peak and a fifth peak, respectively) based on the polymer anion can be respectively observed in a range of more than 1050 $cm^{-1}$ and less than 1200 $cm^{-1}$ and in a range of more than 1550 $cm^{-1}$ and less than or equal to 1750 $cm^{-1}$.

(Thickness of Solid Electrolyte Layer)

An average thickness of the solid electrolyte layer may be in a range from 5 μm to 20 μm, inclusive, for example. Alternatively, the average thickness of the solid electrolyte layer may be in a range from 10 μm to 15 μm, inclusive.

Note that the average thickness of the solid electrolyte layer is obtained by measuring thicknesses at a plurality of arbitrary positions (for example, ten locations) in a cross section that passes a center of the cathode part in a direction parallel to a length direction of the capacitor element and is perpendicular to the length direction of the capacitor element, and by averaging the measured thicknesses.

In the solid electrolytic capacitor of the present disclosure, variations in the thickness of the solid electrolyte layer can be reduced. Hence, high conductivity of the solid electrolyte layer can be secured, and occurrence of leakage current and short circuit can be reduced, so that stable capacitor performance can be secured.

Ratio T1/T2 of thickness T1 of the solid electrolyte layer formed at a corner part of the anode body to thickness T2 of the solid electrolyte layer formed at a central part of the principal surface of the anode body is, for example, in a range from 0.8 to 1.7, inclusive, and may be in a range from 0.8 to 1.5, inclusive, or in a range from 0.9 to 1.4, inclusive. By setting ratio T1/T2 within such a range, the reduction in thickness of the solid electrolyte layer at the corner part can be suppressed. Accordingly, the occurrence of product defects caused by short-circuiting can be suppressed. Furthermore, a decrease in electrostatic capacity, an increase in ESR, or an increase in dielectric dissipation factor tan δ is suppressed, and the quality of the solid electrolytic capacitor is further stabilized.

Note that when the solid electrolyte layer is formed using the dispersion, the dispersion is easily repelled at the corner of the anode body, and in the solid electrolyte layer formed using the dispersion, it is difficult to increase the thickness of the solid electrolyte layer at the corner. Thus, in the solid electrolyte layer formed using the dispersion containing the first polymer component and the second polymer component, usually, the T1/T2 ratio as described above cannot be obtained. Furthermore, when the solid electrolyte layer is formed by chemical polymerization, the aggregate of the first polymer component generated in the treatment liquid randomly adheres to the surface of the anode body, so that the variation in thickness of the solid electrolyte layer increases. On the other hand, when the solid electrolyte layer is formed by electrolytic polymerization, the first polymer component is formed on the entire surface of the anode body by the electrolytic reaction, so that the variation in thickness of the solid electrolyte layer can be reduced. This is because the current tends to concentrate at the corner in the electrolytic reaction. In particular, when a polymerization voltage in the electrolytic polymerization at the time of forming the solid electrolyte layer is controlled within the range described later, it is easy to control ratio T1/T2 within the above range.

Thicknesses T1 and T2 described above are obtained in a cross section perpendicular to a direction from the first end part toward the second end part of the capacitor element at arbitrary positions of parts of the cathode part at a side close to the first end part. Note that there may be a case where this cross section is simply referred to as a cross section G. More specifically, thickness T1 is obtained by measuring thicknesses of the solid electrolyte layers formed at four corner parts of the anode body in cross section G, and by averaging the measured thicknesses. First, in cross section G, a straight line passing through a corner of the anode body is drawn at an angle of 45° with respect to a line obtained by extending outward a line segment corresponding to the principal surface of the anode body. A distance between a point where the straight line intersects with an outer edge of the solid electrolyte layer and a point where the straight line intersects with the corresponding corner is defined as the thickness of the solid electrolyte layer formed at each corner. Thickness T2 is obtained by measuring thicknesses of the solid electrolyte layers formed at the center parts of the pair of principal surfaces of the anode body in cross section G, and by averaging the measured thicknesses. First, in cross section G, a center line that passes middle points of line segments that correspond to the principal surfaces of the anode body is drawn. Then, a distance between a point at which the center line intersects with the outer edge of the solid electrolyte layer and the above-mentioned corresponding middle point is defined as the thickness of the solid electrolyte layer formed at the center part of each of the principal surfaces.

Note that when the anode body has a sheet shape, as described above, thickness T2 may be obtained as an average value for the pair of main surfaces (the principal surfaces) occupying most of the surface of the anode body. When the anode body has a rectangular parallelepiped shape, a cubic shape, or a shape similar thereto, thickness T2 may be obtained by averaging the thicknesses of the central parts obtained for the respective surfaces.

The direction directed from the first end part toward the second end part is assumed as a direction parallel to a straight line direction that connects a center of an end surface of the first end part and a center of an end surface of the second end part to each other. There may be a case where this direction is referred to as a length direction of the anode body or the capacitor element. Cross section G is a cross section of a part of the capacitor element where the cathode part is formed. Cross section G is a cross section in a plain perpendicular to the length direction of the capacitor element at an arbitrary position between an end part of the cathode part at a side close to the first end part and a position of a half of the length of the cathode part in the direction parallel to the length direction of the capacitor element. Note that the cross section of the capacitor element can be observed by an optical microscope, for example.

(Others)

The solid electrolyte layer may be a single layer or may be formed of a plurality of layers. For example, the solid electrolyte layer may include a first solid electrolyte layer covering at least a part of the dielectric layer and a second solid electrolyte layer covering at least a part of the first solid electrolyte layer. When the solid electrolyte layer is composed of a plurality of layers, it is preferable that all the layers contain the first polymer component and the second polymer component. However, the type, composition, content, and the like of each of the first polymer component and the second polymer component contained in each layer may be different or the same in each layer. When a layer covering at least the dielectric layer (that is, an inner layer) such as the first solid electrolyte layer contains the first polymer component and the second polymer component, fine recesses on the surface of the dielectric layer can be highly filled with the conductive polymer component although the layer contains the second polymer component. When an outer layer such as the second solid electrolyte layer contains the first polymer component and the second polymer component, the Raman spectrum as described above is obtained, so that the segregation of the first polymer component in the surface layer can be suppressed, and the effect of reducing the variation in the thickness of the solid electrolyte layer can be enhanced. Hence, stable capacitor performance can be obtained, and occurrence of leakage current and short circuit can be reduced.

The solid electrolyte layer may contain, in addition to the first polymer component and the second polymer component, at least one selected from the group consisting of other dopants, additive agents (known additive agents and the like), and known conductive materials other than the first polymer component.

Examples of the other dopants include anions other than the polymer anion.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include para-toluenesulfonic acid and naphthalenesulfonic acid.

Examples of the conductive material include at least one selected from the group consisting of conductive inorganic materials such as manganese dioxide and TCNQ complex salts.

Note that a layer for improving adhesiveness may be interposed between the dielectric layer and the solid electrolyte layer.

(Method of Forming Solid Electrolyte Layer)

The solid electrolyte layer can be formed by electrolytically polymerizing a precursor of the first polymer component in the presence of the second polymer component on the surface of the dielectric layer. For example, electrolytic polymerization is performed in a state where a cathode formation part of an anode body having a dielectric layer formed on a surface thereof is immersed in a liquid mixture containing a precursor of the first polymer component and the second polymer component. By performing such electrolytic polymerization, unlike the case of using a dispersion, fine recesses on the surface of the dielectric layer can be highly filled with the conductive polymer component. Furthermore, the orientation of the first polymer component can be enhanced in the solid electrolyte layer.

The first polymer component and the second polymer component can be dispersed in the solid electrolyte with high dispersibility. Since the precursor of the first polymer component has a relatively low molecular weight, the liquid component is easily attached not only to the central part but also to the corner part of the anode body, and polymerization can proceed even at the corner part, so that variations in thickness can be reduced.

Examples of the precursor of the first polymer component include a raw material monomer of the first polymer component, an oligomer and a prepolymer in which a plurality of molecular chains of the raw material monomer are linked, and the like. One kind of precursor may be used, or two or more kinds thereof may be used in combination. It is preferable to use, as the precursor, at least one selected from the group consisting of monomers and oligomers (in particular, monomers) from the viewpoint of easily adhering to the corners of the anode body, smoothly advancing polymerization even at the corners, and easily increasing the thickness of the solid electrolyte layer at the corners.

The liquid mixture usually contains a solvent. Examples of the solvent include water, an organic solvent, and a mixed solvent of water and an organic solvent (such as a water-soluble organic solvent).

The temperature at which the electrolytic polymerization is performed is, for example, in a range from 5° C. to 60° C., inclusive, and may be in a range from 15° C. to 35° C., inclusive.

When other dopants, other conductive materials, additive agents, and the like are used, they may be added to the liquid mixture.

The liquid component may contain an oxidizing agent as necessary. Furthermore, the oxidizing agent may be applied to the anode body before or after the liquid mixture is brought into contact with the anode body on which the dielectric layer is formed. Examples of such an oxidizing agent include a sulfate, a sulfonic acid, and a salt thereof. One kind of oxidizing agent can be used singly, or two or more kinds of oxidizing agents can be used in combination. As the sulfate, for example, a salt of a sulfuric acid such as ferric sulfate or sodium persulfate or a sulfuric acid group such as persulfuric acid and metal can be named. Examples of the metal constituting the salt include alkali metals (sodium, potassium, and the like), iron, copper, chromium, and zinc. The sulfonic acid or a salt of the sulfonic acid has a function as a dopant in addition to a function as the oxidizing agent. As the sulfonic acid or a salt thereof, a low molecular sulfonic acid or a salt thereof exemplified for other dopants may be used.

In the electrolytic polymerization, a voltage (polymerization voltage) applied to the anode body is, for example, in a range from 0.8 V to 2.0 V, inclusive, and may be in a range from 1.0 V to 1.5 V, inclusive. By setting the polymerization voltage within such a range, the polymerization of the precursor of the first polymer component can smoothly proceed even though the polymerization is performed in the presence of the second polymer component. Note that the polymerization voltage is a polymerization potential with respect to a silver reference electrode (silver/silver chloride electrode ($Ag/Ag^+$)).

(Cathode Lead-Out Layer)

The cathode lead-out layer only needs to include at least a first layer that is in contact with the solid electrolyte layer and covers at least a part of the solid electrolyte layer, and may include a first layer and a second layer covering the first layer. Examples of the first layer include a layer containing conductive particles and a metal foil. Examples of the conductive particles include at least one selected from conductive carbon and metal powder. For example, the cathode lead-out layer may be formed of a layer containing conductive carbon (also referred to as a carbon layer) as the first layer and a layer containing metal powder or a metal foil as the second layer. When a metal foil is used as the first layer, this metal foil may constitute the cathode lead-out layer.

Examples of the conductive carbon include graphite (artificial graphite, natural graphite, etc.).

The layer containing metal powder as the second layer can be formed, for example, by laminating a composition containing metal powder on a surface of the first layer. Examples of such a second layer include a metal paste layer formed using a composition containing metal powder such as silver particles and a resin (binder resin). As the resin, although a thermoplastic resin can be used, a thermosetting resin such as an imide resin or an epoxy resin is preferably used.

When a metal foil is used as the first layer, the type of metal is not particularly limited, but it is preferable to use a valve metal such as aluminum, tantalum, or niobium, or an alloy containing the valve metal. A surface of the metal foil may be roughened as necessary. On a surface of the metal foil may be provided an anodization film, and a film of a metal (different type of metal) different from the metal that constitutes the metal foil, or a nonmetal film. Examples of the different type of metal and nonmetal include metals such as titanium and nonmetals such as carbon (conductive carbon and the like).

A coating film of the different type of metal or nonmetal (for example, conductive carbon) may be used as the first layer, and the metal foil may be used as the second layer.

(Separator)

When the metal foil is used for the cathode lead-out layer, a separator may be disposed between the metal foil and the anode foil. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end part of a cathode terminal is electrically connected to the cathode lead-out layer. For example, a conductive adhesive is applied to the cathode lead-out layer, and the cathode terminal is bonded to the cathode lead-out layer via the conductive adhesive. One end part of an anode terminal is electrically connected to the anode body. The other end part of the anode terminal and the other end part of the cathode terminal are drawn out from a resin exterior body or a case. The other end part of each terminal exposed from the resin exterior body or the case is used for, for example, solder connection to a substrate on which the solid electrolytic capacitor is to be mounted.

The capacitor element is sealed using the resin exterior body or the case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part on a side of the other end part of each of the anode terminal and the cathode terminal connected to an anode lead drawn out from the capacitor element is exposed from the mold. Furthermore, the solid electrolytic capacitor may be formed by housing the capacitor element in a bottomed case such that a part on the other end part side of each of the anode terminal and the cathode terminal is positioned on an opening side of the bottomed case, and sealing the opening of the bottomed case with a sealing body.

FIG. 1 is a cross-sectional view schematically illustrating a structure of a solid electrolytic capacitor according to a first exemplary embodiment of the present disclosure. As illustrated in FIG. 1, solid electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. In the illustrated example, solid electrolyte layer 9 contains the first polymer component and the second polymer component, and exhibits a peak characteristic for the first polymer component in the Raman spectrum of the surface layer. With such a configuration, high conductivity of solid electrolyte layer 9 can be secured, and high physical and electrical bonding property between solid electrolyte layer 9 and carbon layer 11 can be secured. Thus, in solid electrolytic capacitor 1, initial ESR can be kept low. Furthermore, entry of air into solid electrolyte layer 9 can be suppressed. Hence, even when solid electrolytic capacitor 1 is used for a long period or exposed to a high temperature, an increase in ESR can be suppressed to a low level.

Anode body 6 includes a region facing cathode part 8 and a region not facing the cathode part. In the region of anode body 6 that does not face cathode part 8, insulating separation layer 13 is formed in a part adjacent to cathode part 8 to cover a surface of anode body 6 in a band shape, so that contact between cathode part 8 and anode body 6 is restricted. Among a region of anode body 6 not facing cathode part 8, the other part is electrically connected to anode terminal 4 by welding. Cathode terminal 5 is electrically connected to cathode part 8 via adhesive layer 14 formed of a conductive adhesive.

Figure 2:
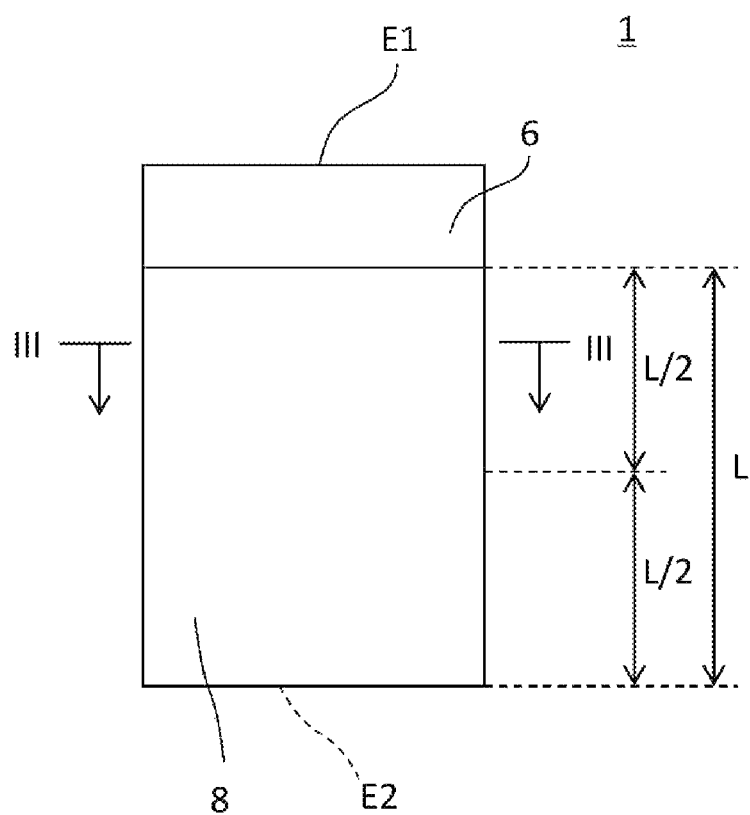
FIG. 2 is a schematic front view illustrating the solid electrolytic capacitor element as viewed from a side of one principal surface.
Figure 3:
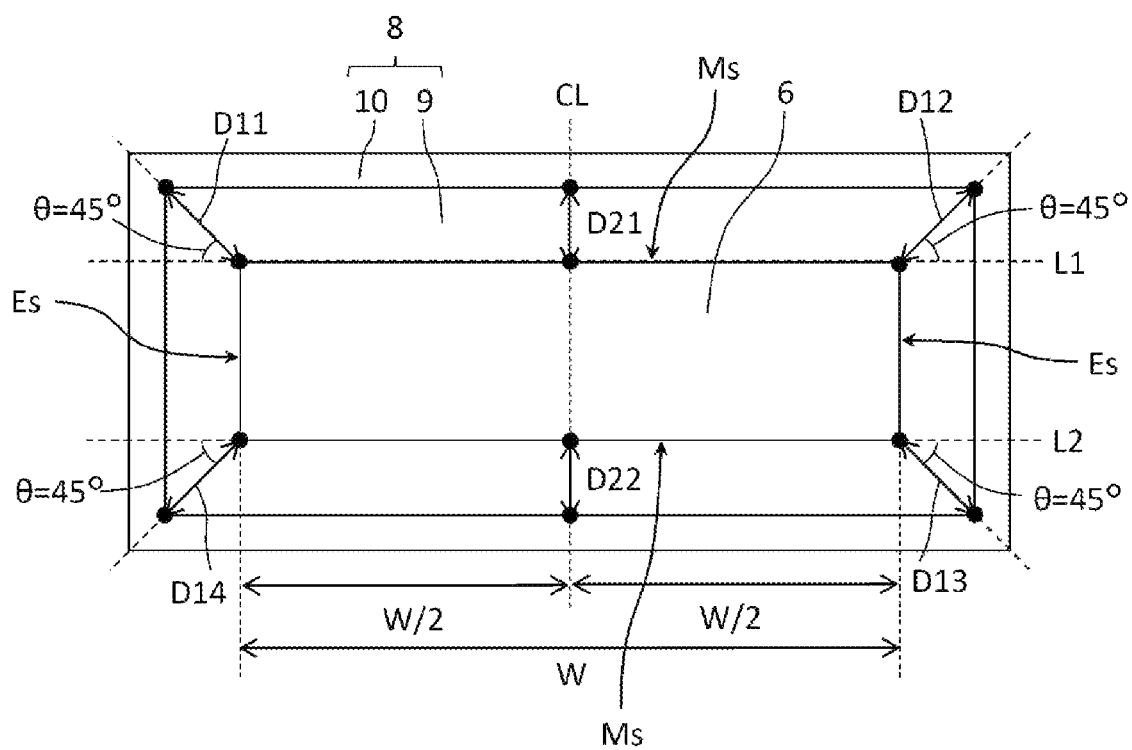
FIG. 3 is a schematic cross-sectional view of the solid electrolytic capacitor element taken along line in FIG. 2 as viewed in a direction of an arrow.

FIG. 2 is a schematic front view of capacitor element 2 as viewed from one principal surface side. FIG. 3 is a schematic cross-sectional view of capacitor element 2 taken along line in FIG. 2 (cross section G) as viewed in a direction of an arrow. Thicknesses T1 and T2 of solid electrolyte layer 9 are determined, for example, by the following procedure.

Ratio T1/T2 is obtained in cross section G of cathode part 8 perpendicular to a direction from first end part E1 to second end part E2 of capacitor element 2 (sometimes referred to as a length direction of anode body 6 or capacitor element 2). Here, cross section G is formed at an arbitrary position in a part of cathode part 8 at a side close to first end part E1. When a length of cathode part 8 in the length direction of capacitor element 2 is L, the part of cathode part 8 at a side close to first end part E1 is a part from an end part of cathode part 8 at a side close to first end part E1 to a position of length L/2. In FIG. 2, the part of cathode part 8 at a side close to first end part E1 corresponds to an upper half part of cathode part 8.

FIG. 3 illustrates cross section G of capacitor element 2 perpendicular to the length direction of capacitor element 2 along line in the part of cathode part 8 at a side close to first end part E1. Line corresponds to an arbitrarily selected position in the part of cathode part 8 at a side close to first end part E1. Note that, in FIG. 3, hatching indicating a cross section is omitted.

In cross section G, a pair of principal surfaces Ms of sheet-like anode body 6 and a pair of end surfaces Es located at end parts of the pair of principal surfaces Ms are seen. Since corner parts exist between each of principal surfaces Ms and each of end surface Es, four corner parts can be confirmed in cross section G of anode body 6. A line parallel to each principal surface Ms is extended outward to draw virtual straight lines L1 and L2, and then a straight line that passes through a corner and forms an angle of 45° with straight line L1 or L2 is drawn. Each of distances D11, D12, D13, and D14 between a point where the straight line intersects with the outer edge of solid electrolyte layer 9 and a point where the straight line intersects with the corresponding corner is defined as the thicknesses of solid electrolyte layer 9 at each corner. Then, T1 is obtained by averaging the values of these four distances.

In cross section G, when a width of anode body 6 corresponding to a length of a line segment corresponding to principal surface Ms is W, center line CL is drawn at a position of W/2 from each end surface Es. Center line CL passes through a midpoint of a line segment corresponding to each principal surface Ms of anode body 6. Distances D21 and D22 between an intersection of center line CL and the outer edge of solid electrolyte layer 9 and the midpoint of the line segment are defined as the thicknesses of solid electrolyte layer 9 at a central part of the principal surface Ms. T2 is obtained by averaging the values of these two distances.

Examples

Hereinafter, the present invention is specifically described with reference to examples and comparative examples, but the present invention is not limited to the following examples.

<<Solid Electrolytic Capacitor A1>>

Solid electrolytic capacitor 1 (solid electrolytic capacitor A1) illustrated in FIG. 1 was produced in the following manner, and its characteristics were evaluated.

(1) Preparation of Anode Body 6

Both surfaces of an aluminum foil (thickness: 100 μm) as a base material were roughened by etching to prepare anode body 6.

(2) Formation of Dielectric Layer 7

A part on the other end part side of anode body 6 was immersed in an anodizing solution, and a DC voltage of 70 V was applied for 20 minutes to form dielectric layer 7 containing aluminum oxide.

(3) Formation of Solid Electrolyte Layer 9

A mixed solution was prepared by dissolving a 3,4-ethylenedioxythiophene monomer and polystyrene sulfonic acid (PSS, Mw: $160 \times 10^3$) as a polymer anion in ion-exchanged water. While the mixed solution was stirred, iron (III) sulfate (oxidant) dissolved in ion-exchanged water was added to the mixed solution to prepare a polymerization liquid.

Anode body 6 on which dielectric layer 7 was formed in the above step (2) and a counter electrode were immersed in the obtained polymerization liquid, and electrolytic polymerization was performed at a polymerization voltage of 1.0

V (polymerization potential with respect to a silver reference electrode) at 25° C. to form solid electrolyte layer 9.

(4) Formation of Cathode Lead-Out Layer 10

Anode body 6 obtained in the above step (3) was immersed in a dispersion liquid in which graphite particles were dispersed in water, taken out from the dispersion liquid, and then dried to form carbon layer 11 at least on a surface of solid electrolyte layer 9. Drying was carried out at a temperature ranging from 130° C. to 180° C. for 10 minutes to 30 minutes.

Next, a silver paste containing silver particles and a binder resin (epoxy resin) was applied onto a surface of carbon layer 11, and heated at 150° C. to 200° C. for 10 minutes to 60 minutes to cure the binder resin, thereby forming metal paste layer 12. Cathode lead-out layer 10 composed of carbon layer 11 and metal paste layer 12 was thus formed, and cathode part 8 composed of solid electrolyte layer 9 and cathode lead-out layer 10 was formed.

Capacitor element 2 was produced as described above.

(5) Assembly of Solid Electrolytic Capacitor

Cathode part 8 of capacitor element 2 obtained in the above step (4) was bonded to one end part of cathode terminal 5 with adhesive layer 14 of a conductive adhesive. One end part of anode body 6 protruding from capacitor element 2 and one end part of anode terminal 4 were joined by laser welding.

Subsequently, resin exterior body 3 made of an insulating resin was formed around capacitor element 2 by molding. At this time, the other end part of anode terminal 4 and the other end part of cathode terminal 5 were drawn out from resin exterior body 3.

In this way, solid electrolytic capacitor 1 (A1) was completed. In the same manner as described above, a total of 20 solid electrolytic capacitors 1 were prepared.

(6) Evaluation

The following evaluations were performed using the solid electrolytic capacitors.

(a) Electrostatic Capacity, Tan δ, and ESR

Under an environment of 20° C., initial electrostatic capacity (μF) and initial tan δ of each solid electrolytic capacitor at a frequency of 120 kHz were measured, and initial ESR (mΩ) at a frequency of 100 kHz was measured using an LCR meter for 4-terminal measurement. Then, an average value of the 20 solid electrolytic capacitors was obtained.

Next, the solid electrolytic capacitors were subjected to an acceleration test by applying a rated voltage to the solid electrolytic capacitors for 1000 hours under an environment of 145° C. Thereafter, the electrostatic capacity, tan δ, and ESR after the acceleration test were measured in an environment at 20° C. in the same manner as in the initial electrostatic capacity, tan δ, and ESR, and an average value of the 20 solid electrolytic capacitors was obtained.

(b) Leakage Current (LC)

A resistance of 1 kΩ was connected in series to the solid electrolytic capacitors, and leakage currents (initial leakage currents) (μA) after applying a rated voltage of 25 V for 1 minute by a DC power supply were measured to obtain an average value of the 20 solid electrolytic capacitors. After the acceleration test similar to the above (a), an average value of the leakage currents after the acceleration test was obtained similarly to the case of the initial leakage current.

(c) Raman Spectrum Measurement of Solid Electrolyte Layer

The Raman spectrum of the surface layer of the solid electrolyte layer of capacitor element 2 taken out from the solid electrolytic capacitor was measured in accordance with the procedure described above.

Figure 4:
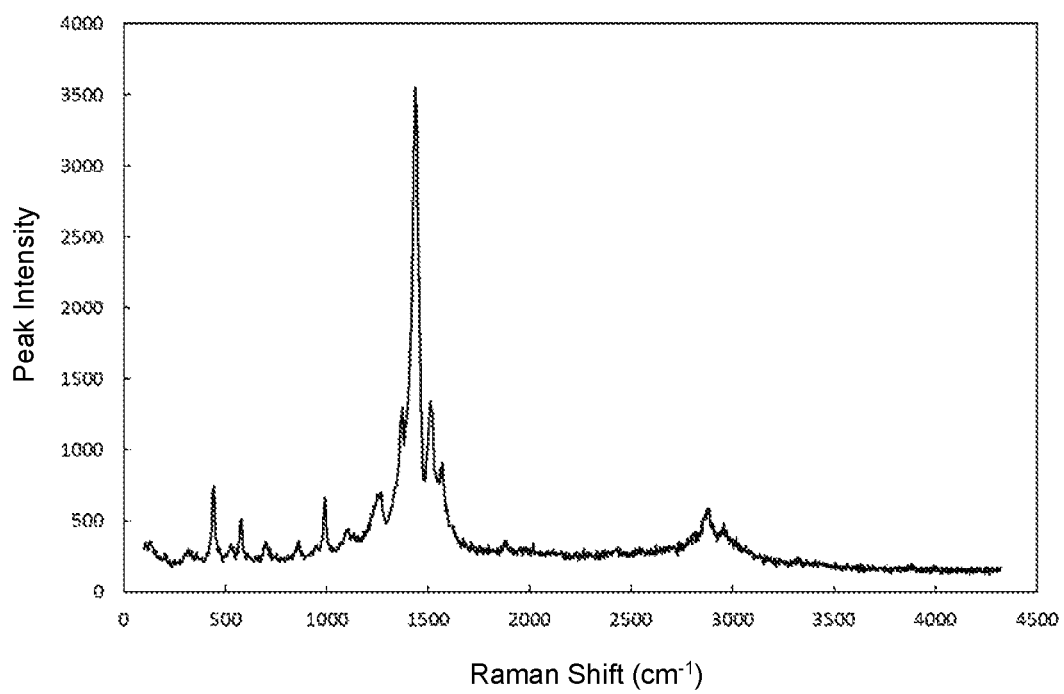
FIG. 4 is a Raman spectrum of a solid electrolyte layer of a solid electrolytic capacitor A1.

A Raman spectrum of the solid electrolyte layer of the solid electrolytic capacitor A1 is illustrated in FIG. 4. As illustrated in FIG. 4, in the Raman spectrum of the surface layer of the solid electrolyte layer of the solid electrolytic capacitor A1, characteristic peaks (first peak and second peak) of PEDOT of the first polymer component were observed at wave numbers of 1423 $cm^{-1}$ and 2800 $cm^{-1}$, respectively. Furthermore, a peak (third peak) based on the PSS of the second polymer component was observed at a wave number of 990 $cm^{-1}$. A ratio ($=I_{p1}/I_{p3}$) of a height of the first peak to a height of the third peak was obtained.

(d) Thickness Ratio T1/T2 of Solid Electrolyte Layer

Thickness ratio T1/T2 of solid electrolyte layer 9 in each solid electrolytic capacitor was obtained by the procedure described above. Then, an average value obtained by averaging the ratios T1/T2 of the 20 solid electrolytic capacitors was obtained.

<<Solid Electrolytic Capacitor B1>>

A liquid dispersion containing poly (3,4-ethylenedioxythiophene) (PEDOT) and PSS as a dopant was prepared by the following procedure.

First, a 3,4-ethylenedioxythiophene monomer was added to an aqueous solution of PSS (Mw: $150 \times 10^3$) under stirring, and then oxidants (iron (III) sulfate and sodium persulfate) were added thereto to carry out chemical oxidation polymerization. The obtained polymerization liquid was filtered by an ion exchange device to remove impurities, thereby obtaining a solution containing PEDOT and PSS. Pure water was added to the obtained solution, and the mixture was homogenized with a high-pressure homogenizer and further filtered with a filter to prepare a liquid dispersion.

Anode body 6 on which dielectric layer 7 was formed, which was obtained in (2) of solid electrolytic capacitor A1, was immersed in a liquid dispersion, then taken out, and further dried at 120° C. for 10 minutes to 30 minutes. Immersion in the first treatment solution and drying were further repeated four times to form solid electrolyte layer 9 containing PEDOT and PSS so as to cover the surface of dielectric layer 7. Solid electrolytic capacitor B1 was produced and evaluated in the same manner as in the case of solid electrolytic capacitor A1 except for using anode body 6 including solid electrolyte layer 9 formed in this manner.

The initial evaluation results and the evaluation results after the acceleration tests are illustrated in Table 1 and Table 2, respectively. In each table, the evaluation result of solid electrolytic capacitor A1 is a relative value when the measured value of solid electrolytic capacitor B1 after the acceleration test is taken as 100%.

TABLE 1

| | | | Initial | | | |
|---|---|---|---|---|---|---|
| | $I_{p1}/I_{p3}$ | Ratio T1/T2 | ESR (%) | Electrostatic capacity (%) | tanδ (%) | LC (%) |
| B1 | — | 0.66 | 100 | 100 | 100 | 100 |
| A1 | 6 | 1.1 | 62 | 125 | 70 | 50 |

TABLE 2

| | $I_{p1}/I_{p3}$ | Ratio T1/T2 | ESR (%) | After acceleration test (after leaving at 145° C. for 1000 hours) | | |
|---|---|---|---|---|---|---|
| | | | | Electrostatic capacity (%) | tanδ (%) | LC (%) |
| B1 | — | 0.66 | 100 | 100 | 100 | 100 |
| A1 | 6 | 1.1 | 85 | 110 | 90 | 95 |

Figure 5:
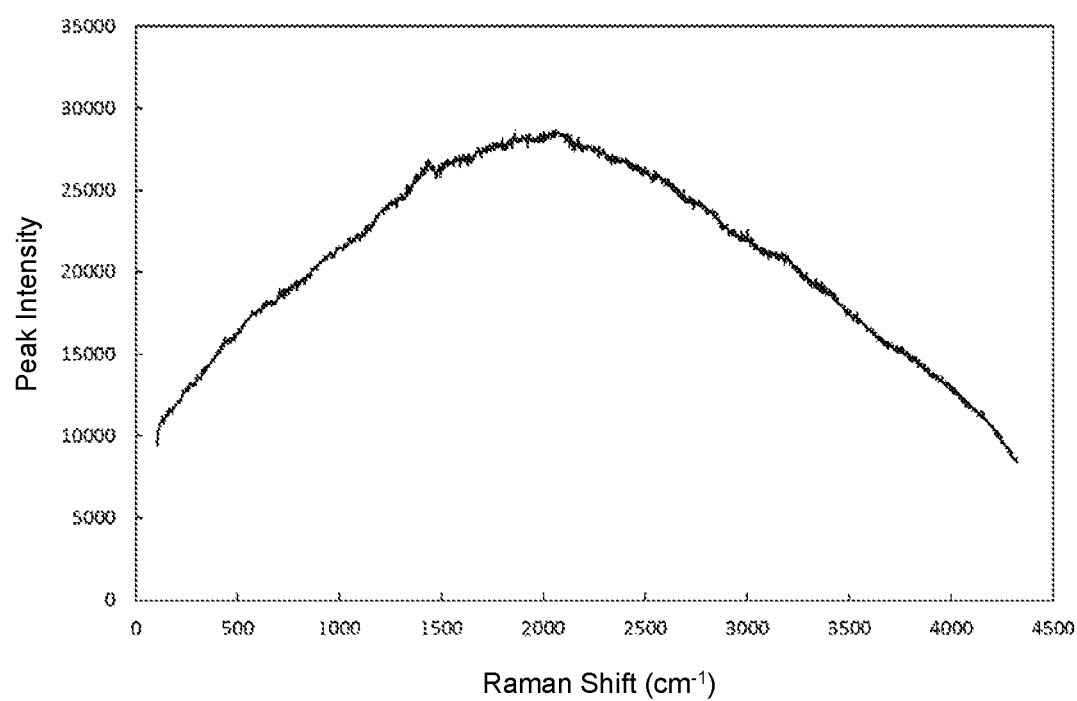
FIG. 5 is a Raman spectrum of a solid electrolyte layer of a solid electrolytic capacitor B1.

Furthermore, FIG. 5 illustrates a Raman spectrum of the surface layer of the solid electrolyte layer of solid electrolytic capacitor B1 measured by the procedure described above. As illustrated in FIG. 5, no characteristic peak was observed in the Raman spectrum of the surface layer of the solid electrolyte layer of solid electrolytic capacitor B1. On the other hand, in the Raman spectrum of the surface layer of the solid electrolyte layer of solid electrolytic capacitor A1, the first peak and the second peak peculiar to PEDOT were observed, and the third to fifth peaks peculiar to PSS were also observed (FIG. 4). In FIG. 5, since no peak is observed, it is considered that observation of Raman scattered light is inhibited by fluorescence emission. On the other hand, in FIG. 4, since the peaks of PEDOT and PSS are clearly observed, it can be seen that fluorescence emission as in the case of B1 does not occur. In B1, PSS segregates to such an extent that remarkable fluorescence emission occurs, whereas in A1, segregation of PSS is not observed, and it is considered that PSS is more uniformly dispersed in the solid electrolyte layer.

Furthermore, corresponding to the difference in the Raman spectra of FIGS. 4 and 5, as illustrated in Table 1, in A1, the initial ESR, tan δ, and leakage current are suppressed to be lower than those in B1, and the electrostatic capacity is also high. Furthermore, as illustrated in Table 2, in A1, the increase in ESR, tan δ, and leakage current after the acceleration test is suppressed, and the decrease in electrostatic capacity is also suppressed as compared with B1.

Note that when the solid electrolyte layer includes an inner first solid electrolyte layer formed by chemical polymerization and an outer second solid electrolyte layer formed by dispersion, a Raman spectrum similar to that of the solid electrolytic capacitor B1 is obtained on the surface layer of the solid electrolyte layer.

INDUSTRIAL APPLICABILITY

According to the present disclosure, the initial ESR of the solid electrolytic capacitor can be kept low. Furthermore, even when the solid electrolytic capacitor is used for a long period of time or the solid electrolytic capacitor is exposed to a high temperature, an increase in ESR can be suppressed to a low level. Therefore, the solid electrolytic capacitor element and the solid electrolytic capacitor can be used for various applications in which high reliability is required.

The invention claimed is:

1. A solid electrolytic capacitor element comprising:
an anode body;
a dielectric layer disposed on a surface of the anode body; and
a cathode part covering at least a part of the dielectric layer,
wherein:
the cathode part includes a solid electrolyte layer covering the at least the part of the dielectric layer,
the solid electrolyte layer contains a first polymer component and a second polymer component, the first polymer component including a monomer unit corresponding to a thiophene compound, the second polymer component including a polymer anion,
a weight-average molecular weight of the polymer anion ranges from 300 to 250,000, inclusive, and
a Raman spectrum of a surface layer in the solid electrolyte layer has a peak characteristic for the first polymer component.

2. The solid electrolytic capacitor element according to claim 1, wherein the peak characteristic for the first polymer component includes a first peak observed at a wavenumber ranging from 1200 $cm^{-1}$ to 1600 $cm^{-1}$, inclusive.

3. The solid electrolytic capacitor element according to claim 1, wherein the peak characteristic for the first polymer component includes a second peak observed at a wavenumber ranging from 2750 $cm^{-1}$ to 3000 $cm^{-1}$, inclusive.

4. The solid electrolytic capacitor element according to claim 1, wherein the polymer anion includes a monomer unit $M_1$ corresponding to an organic sulfonic acid compound.

5. The solid electrolytic capacitor element according to claim 1, wherein:
the peak characteristic for the first polymer component includes a first peak observed at a wavenumber ranging from 1200 $cm^{-1}$ to 1600 $cm^{-1}$, inclusive,
the polymer anion includes a monomer unit $M_2$ corresponding to an aromatic sulfonic acid compound,
the Raman spectrum of the surface layer in the solid electrolyte layer has a third peak characteristic for the polymer anion, the third peak being observed at a wavenumber ranging from 800 $cm^{-1}$ to 1050 $cm^{-1}$, inclusive, and
a ratio ($=I_{p1}/I_{p3}$) of an intensity $I_{p1}$ of the first peak to an intensity $I_{p3}$ of the third peak is 2 or more.

6. The solid electrolytic capacitor element according to claim 1, wherein the first polymer component includes at least a monomer unit corresponding to a 3,4-ethylenedioxythiophene compound as the monomer unit corresponding to the thiophene compound.

7. The solid electrolytic capacitor element according to claim 1, wherein:
the anode body includes an anode lead-out part and a cathode formation part, the anode lead-out part including a first end part of the anode body, the cathode formation part including a second end part of the anode body, and
in a cross section of the solid electrolytic capacitor element, a ratio T1/T2 of a thickness T1 of the solid electrolyte layer formed at a corner part of the anode body to a thickness T2 of the solid electrolyte layer formed at a central part of a principal surface of the anode body is in a range from 0.8 to 1.7, inclusive, the cross section being taken at an arbitrary position in a part of the cathode part at a side close to the first end part and in a plain perpendicular to a direction from the first end part toward the second end part.

8. A solid electrolytic capacitor comprising the solid electrolytic capacitor element according to claim 1.

* * * * *